United States Patent
Uchida et al.

(10) Patent No.: US 10,444,430 B2
(45) Date of Patent: Oct. 15, 2019

(54) OPTICAL WAVEGUIDE STRUCTURE AND OPTICAL WAVEGUIDE CIRCUIT

(71) Applicant: FURUKAWA ELECTRIC CO., LTD., Tokyo (JP)

(72) Inventors: Yasuyoshi Uchida, Tokyo (JP); Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/145,519

(22) Filed: Sep. 28, 2018

(65) Prior Publication Data

US 2019/0033521 A1 Jan. 31, 2019

Related U.S. Application Data

(63) Continuation of application No. PCT/JP2017/010081, filed on Mar. 14, 2017.

(30) Foreign Application Priority Data

Mar. 31, 2016 (JP) ................................. 2016-072504

(51) Int. Cl.
*G02B 6/28* (2006.01)
*G02B 6/12* (2006.01)
(Continued)

(52) U.S. Cl.
CPC ......... *G02B 6/12007* (2013.01); *G02B 6/126* (2013.01); *G02B 6/1228* (2013.01);
(Continued)

(58) Field of Classification Search
CPC ........ G02B 6/28; G02B 6/125; G02B 6/2813; G02B 6/2804; G02B 6/2817
See application file for complete search history.

(56) References Cited

U.S. PATENT DOCUMENTS

| 7,236,668 B2 | 6/2007 | Hanashima et al. |
| 8,526,102 B2 | 9/2013 | Inoue et al. |

(Continued)

FOREIGN PATENT DOCUMENTS

| JP | 2004-258610 | 9/2004 |
| JP | 2006-184756 | 7/2006 |

(Continued)

OTHER PUBLICATIONS

International Search Report dated May 30, 2017 in PCT/JP2017/010081 filed Mar. 14, 2017 (with English Translation).

(Continued)

*Primary Examiner* — Jennifer Doan
(74) *Attorney, Agent, or Firm* — Oblon, McClelland, Maier & Neustadt, L.L.P.

(57) ABSTRACT

An optical waveguide structure includes: a cladding; a first core in the cladding having a first end surface; a second core in the cladding having a second end surface; slit formed horizontally with respect to a waveguide direction of the light to be waveguided by the first and second cores; and a first part and a second part composed of a material identical to a material of the cladding, wherein a pair of the first and second end surfaces disposed opposing each other with the slit interposed between the pair of the first and second end surfaces, the first part is interposed between the first end surface and the slit, and the second part is interposed between the second end surface and the slit.

6 Claims, 8 Drawing Sheets

(51) Int. Cl.
    *G02B 6/126*     (2006.01)
    *G02B 6/122*     (2006.01)
    *G02B 6/293*     (2006.01)
    *G02B 6/13*     (2006.01)
    *G02B 6/125*     (2006.01)

(52) U.S. Cl.
    CPC ............ *G02B 6/13* (2013.01); *G02B 6/2938* (2013.01); *G02B 6/125* (2013.01); *G02B 6/29344* (2013.01)

(56) References Cited

U.S. PATENT DOCUMENTS

2002/0051598 A1*   5/2002   Atoji .................... G02B 6/274
                                                                                                    385/11
2004/0067023 A1    4/2004   Hanashima et al.
2013/0322809 A1*  12/2013   Goh ................... H04B 10/5161
                                                                                                    385/3
2015/0016768 A1    1/2015   Yamazaki

FOREIGN PATENT DOCUMENTS

JP              5684131        3/2015
WO    WO 2013/136393 A1    9/2013

OTHER PUBLICATIONS

Written Opinion dated May 30, 2017 in PCT/JP2017/010081 filed Mar. 14, 2017.

\* cited by examiner

OPTICAL WAVEGUIDE STRUCTURE AND OPTICAL WAVEGUIDE CIRCUIT

CROSS-REFERENCE TO RELATED APPLICATION

This application is a continuation of international Application no. PCT/JP2017/010081, filed on Mar. 14, 2017 which claims the benefit of priority of the prior Japanese patent Application no. 2016-072504, filed on Mar. 31, 2016, the entire contents of which are incorporated herein by reference.

BACKGROUND

The present disclosure relates to an optical waveguide structure and an optical waveguide circuit.

A quadrature phase modulation method has been popular as a representative and practical coherent modulation method; Further, since a Dual Polarization Quadrature Phase Shift Keying (DP-QPSK) method using the quadrature phase modulation method in combination with a polarization multiplexing technique can increase frequency utilization efficiency, the DP-QPSK method is considered to be a more promising technique for realizing high capacity optical transmission.

As a demodulator of the DP-QPSK modulation method, there is known a configuration example realized by an optical waveguide circuit including elements integrated by using a Planar Lightwave Circuit (PLC) technique (see JP 5684131 B, for example).

SUMMARY

Meanwhile, in an optical waveguide circuit and the like for a DP-QPSK modulation method utilizing a polarization multiplexing technique, a waveplate may be provided midway in an optical waveguide. Then, in a case where the waveplate is provided midway in the optical waveguide, a manufacturing method including forming a slit to cut the optical waveguide, and inserting the waveplate into the slit is generally used.

However, when the slit is formed, a variation occurs in the slit width of the slit formed, and such a variation may cause a variation in a loss in the optical waveguide. This is because a loss between two optical waveguides arranged with a space between the two optical waveguides depends on a distance between cores of the optical waveguides. When the slit is formed to cut the optical waveguide, a variation in the slit width directly leads to a variation in the distance between the cores cut.

There is a need for an optical waveguide structure and an optical waveguide circuit capable of suppressing a variation in a loss of an optical waveguide due to a variation in the slit width of a slit provided horizontally with respect to an optical waveguide.

An optical waveguide structure according to one aspect of the present disclosure includes: a cladding; a first core in the cladding having a first end surface; a second core in the cladding having a second end surface; slit formed horizontally with respect to a waveguide direction of the light to be waveguided by the first and second cores; and a first part and a second part composed of a material identical to a material of the cladding, wherein a pair of the first and second end surfaces disposed opposing each other with the slit interposed between the pair of the first and second end surfaces, the first part is interposed between the first end surface and the slit, and the second part is interposed between the second end surface and the slit.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an embodiment of an optical waveguide structure and an optical waveguide circuit according to the present disclosure will be described in detail with reference to the drawings. Note that the present disclosure is not limited by the embodiment described below. In addition, in each drawing, the same or corresponding elements are denoted by the same reference signs as appropriate. Further note that the drawings are schematic, and a relationship of the dimensions of each element, a ratio of the dimensions of each element, and the like may differ from the actual relationship, ratio, and the like. The drawings may include parts differing in a relationship and ratio of the dimensions between the drawings.

Example of Optical Waveguide Circuit

Figure 1:
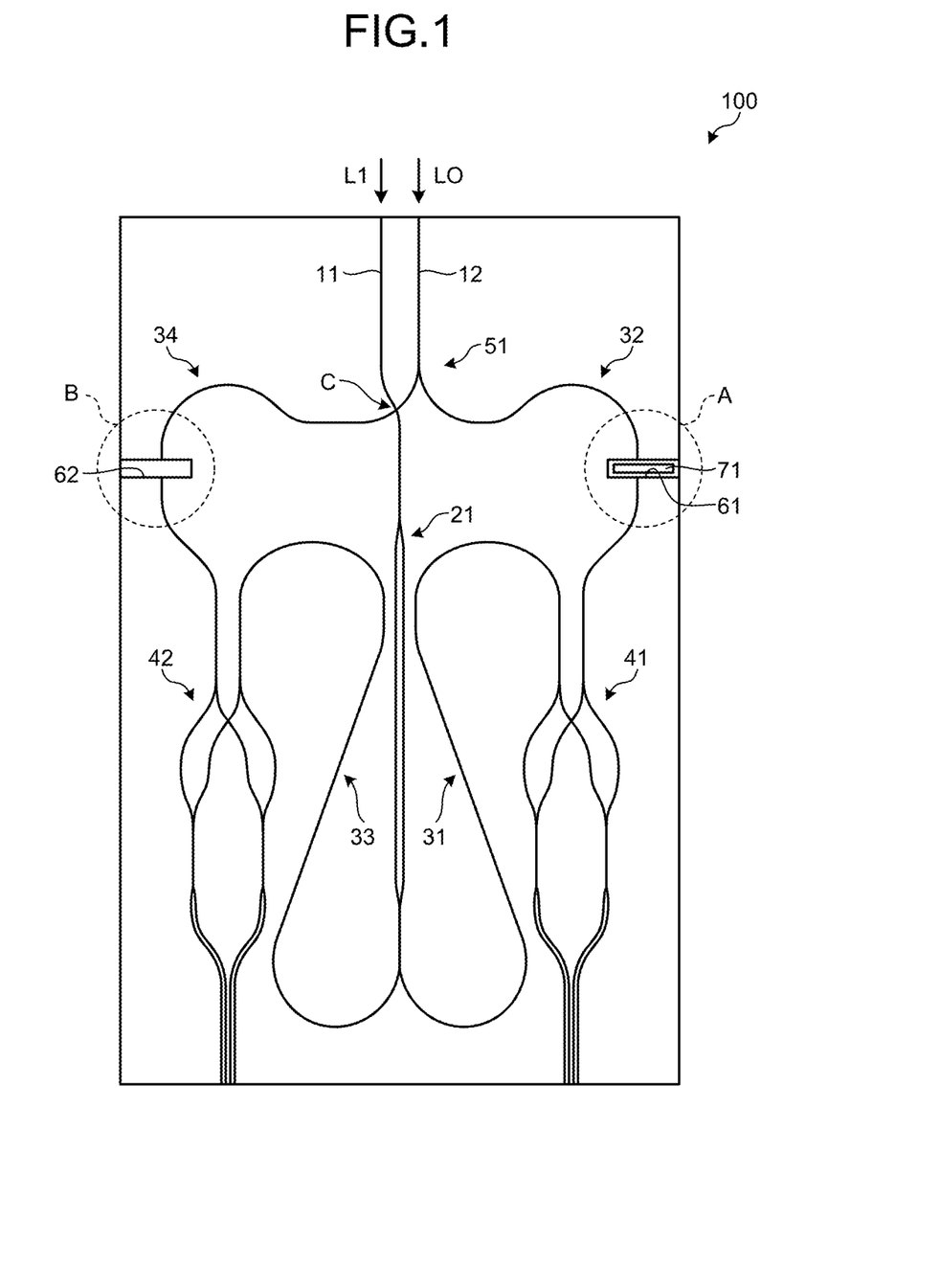
FIG. 1 is a schematic plan view of an optical waveguide circuit according to an embodiment.

FIG. 1 is a schematic plan view of an optical waveguide circuit according to the embodiment. The optical waveguide circuit illustrated in FIG. 1 is a PLC type optical waveguide circuit composed of a silica glass material, and a configuration example of the optical waveguide circuit will be described, assuming that the optical waveguide circuit is used as a coherent mixer used in a demodulator of a DP-QPSK modulation method. A configuration of the optical waveguide circuit illustrated in FIG. 1 is a configuration example suitable for application of an optical waveguide structure according to the embodiment described below, and for example, the optical waveguide structure according to the embodiment described below can be applied to each of optical waveguides in regions A and B in FIG. 1.

As illustrated in FIG. 1, an optical waveguide circuit 100 includes: input optical waveguides 11 and 12; a polarization demultiplexer 21; connection optical waveguides 31, 32, 33, and 34; 90-degree hybrid elements 41 and 42; a Y-branch optical waveguide 51; slits 61 and 62; and a half waveplate 71.

The input optical waveguide 11 to which a signal light L1 is input is connected to the polarization demultiplexer 21 via a bent portion having an S shape and formed by combining bent portions having opposite curvatures, equal curvature radii, and equal arc angles. On the other hand, the input optical waveguide 12 to which a local oscillation light LO is input is connected to the Y-branch optical waveguide 51 in a substantially straight line.

More specifically, the polarization demultiplexer 21 includes a Y-branch optical waveguide, a directional coupler, and two arm optical waveguides configured to connect the Y-branch optical waveguide and the directional coupler, and includes a Mach-Zehnder Interferometer (MZI) type interferometer configuration. The connection optical waveguides 31 and 33 are optical paths configured to connect optical paths of light beams demultiplexed by the polarization demultiplexer 21 to the 90-degree hybrid elements 41 and 42, respectively.

The Y-branch optical waveguide 51 branches the local oscillation light LO input to the input optical waveguide 12 into the connection optical waveguides 32 and 34 at a branching ratio of 1:1. The connection optical waveguides 32 and 34 are optical paths configured to connect optical paths of light beams demultiplexed by the Y-branch optical waveguide 51 to the 90-degree hybrid elements 41 and 42, respectively.

The 90-degree hybrid elements 41 and 42 are each a kind of interference circuit, and are circuits configured to bifurcate the input signal light L1 and the local oscillation light LO, respectively and provide the local oscillation light LO bifurcated with a phase difference of 90 degrees as a relative phase difference of a light wave, and then mix one beam of the signal light L1 bifurcated with the local oscillation light LO and the other beam of the signal light L1 bifurcated with the local oscillation light LO, respectively.

Here, as illustrated in FIG. 1, a slit 61 is provided in a region A of the connection optical waveguide 32 from the Y-branch optical waveguide 51 to the 90-degree hybrid element 41, and the half waveplate 71 is inserted into the slit 61. Note that an optical axis of the half waveplate 71 is adjusted to form an angle of 45 degrees with a polarization axis of the connection optical waveguide 32. Accordingly, the local oscillation light LO passing through the half waveplate 71 is input to the 90-degree hybrid element 41 after a polarized wave of the local oscillation light LO is rotated by 90 degrees.

On the other hand, a slit 62 is provided in a region B of the connection optical waveguide 34 from the Y-branch optical waveguide 51 to the 90-degree hybrid element 42, but no half waveplate is inserted into the slit 62. Accordingly, the local oscillation light LO is input to the 90-degree hybrid element 42 with a polarized wave of the local oscillation light LO as is.

Meanwhile, the reason that no half waveplate is inserted into the slit 62 even though the slit 62 is provided in the connection optical waveguide 34 is as follows.

Since the slit 61 is provided in the connection optical waveguide 32 and the half waveplate 71 is inserted into the slit 61, a corresponding loss is generated. Accordingly, in such a state, the local oscillation light input to the 90-degree hybrid element 41 suffers an excessive loss in comparison to the local oscillation light input to the 90-degree hybrid element 42. Therefore, in the optical waveguide circuit 100, the slit 62 is also provided in the connection optical waveguide 34 to compensate for the loss.

For the above-described purpose, the slit width of the slit 62 provided in the connection optical waveguide 34 is preferably designed to generate a loss in an amount corresponding to the loss generated by the slit 61 and the half waveplate 71 in the connection optical waveguide 32. Note that, since an intersection C exists in the connection optical waveguide 34, the slit width of the slit 62 is more preferably designed in consideration of an intersection loss generated at the intersection C.

Example of Optical Waveguide Structure

Hereinafter, an optical waveguide structure according to the embodiment applicable in the region A or the region B illustrated in FIG. 1 will be described. Note that, to avoid redundancy of description, although an example of the optical waveguide structure described below includes a configuration in which a waveplate is inserted into a slit, a configuration in which no waveplate is inserted into a slit can also be made as with the example described below, with the exception of the presence or absence of the waveplate.

Figure 2:
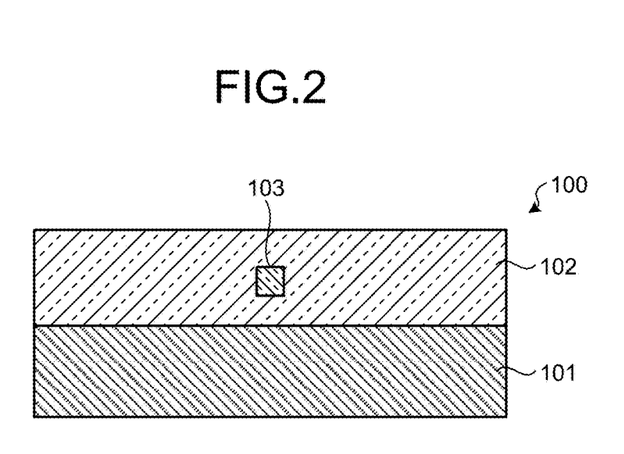
FIG. 2 is a view illustrating a cross section in a horizontal direction of an optical waveguide in a PLC type optical waveguide circuit composed of a silica glass material.

FIG. 2 is a view illustrating a cross section in a horizontal direction of an optical waveguide in a PLC type optical waveguide circuit composed of a silica glass material. As illustrated in FIG. 2, the optical waveguide circuit 100 is configured by forming, in a cladding 102 composed of a silica glass material and formed on a substrate 101 composed of silicon or the like, a core 103 having a refractive index higher than a refractive index of the cladding 102. To obtain the core 103 having a refractive index higher than a refractive index of the cladding 102, zirconia ($ZrO_2$), germania ($GeO_2$), or the like may be doped into a silica glass type material, for example. Here, the core 103 includes a configuration substantially corresponding to the optical waveguide in the optical waveguide circuit 100, and is described as a configuration representing an optical waveguide such as the connection optical waveguides 33 and 34 illustrated in FIG. 1.

Figure 3:
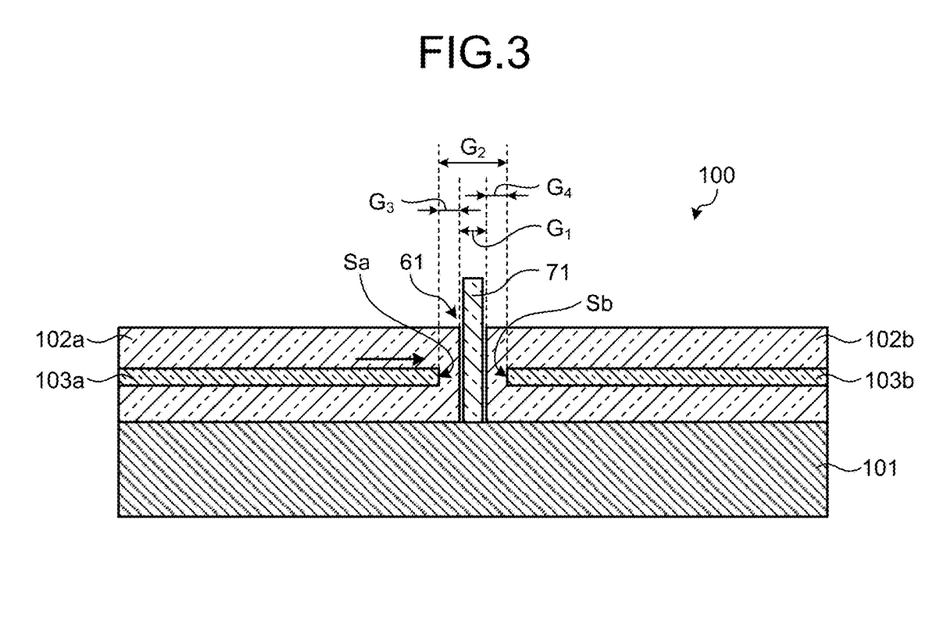
FIG. 3 is a view illustrating a cross section in a light propagation direction of an optical waveguide structure according to the embodiment.

FIG. 3 is a view illustrating a cross section in a light propagation direction of the optical waveguide structure according to the embodiment. As illustrated in FIG. 3, the optical waveguide structure according to the embodiment includes the slit 61 formed horizontally with respect to a waveguide direction (a direction of an arrow in FIG. 3) of light waveguided by cores 103a and 103b. The slit 61 is, for example, a slit into which the half waveplate 71 is inserted, and an optical element suitable for the purpose of use of the optical waveguide structure according to the embodiment can be inserted into the slit 61. In addition, the slit 61 can also include a configuration in which no optical element is inserted into the slit 61, as in the region B illustrated in FIG. 1.

The cores 103a and 103b are divided into the core 103a and the core 103b with the slit 61 interposed between cores 103a and 103b, and an end surface Sa of the core 103a and an end surface Sb of the core 103b are disposed opposing each other with the slit 61 interposed between the end surface Sa and the end surface Sb. In addition, a part composed of a material identical to a material of a cladding 102a is interposed between the end surface Sa of the core 103a and the slit 61, and a part composed of a material identical to a material of a cladding 102b is interposed between the end surface Sb of the core 103b and the slit 61.

Note that here, to facilitate description with reference to the drawings, the cladding 102a and the cladding 102b are described discriminatively, but in general, outside the drawings, the cladding 102a and the cladding 102b are connected and composed of the same material.

According to the above-described configuration, in the optical waveguide structure according to the embodiment, light emitted from the end surface Sa of the core 103a sequentially passes through the part composed of a material identical to a material of the cladding 102a, the half waveplate 71 inserted into the slit 61, and the part composed of a material identical to a material of the cladding 102b, and enters the end surface Sb of the core 103b.

In other words, according to the above-described configuration, in the optical waveguide structure according to the embodiment, a width $G_1$ of the slit 61 is less than a width $G_2$ between the end surface Sa of the core 103a and the end surface Sb of the core 103b.

In addition, any of a width $G_3$ of the part composed of a material identical to a material of the cladding 102a and interposed between the end surface Sa of the core 103a and the slit 61, and a width $G_4$ of the part composed of a material identical to a material of the cladding 102b and interposed between the end surface Sb of the core 103b and the slit 61 is preferably less than or equal to 3 μm. Although resistance to a variation in the width of the slit 61 increases as the width $G_3$ and the width $G_4$ increase, in view of balance with suppressing to reduce a coupling loss between the core 103a and the core 103b, each of the width $G_3$ and the width $G_4$ is preferably less than or equal to 3 μm.

Note that any of the above-described widths $G_1$, $G_2$, $G_3$, and $G_4$ corresponds to a length measured in the waveguide direction of the light waveguided by the cores 103a and 103b.

Hereinafter, an example of a shape of an end portion of each of the cores 103a and 103b in the optical waveguide structure according to the embodiment will be described. As will be described below, the end portions of the cores 103a and 103b each have a shape designed to reduce a coupling loss between the cores 103a and 103b. The optical waveguide structure according to the embodiment can suppress influence of a variation in the slit width on a loss of an optical waveguide while the optical waveguide structure is suitably designed to reduce a coupling loss.

MMI Shape

Figure 4:
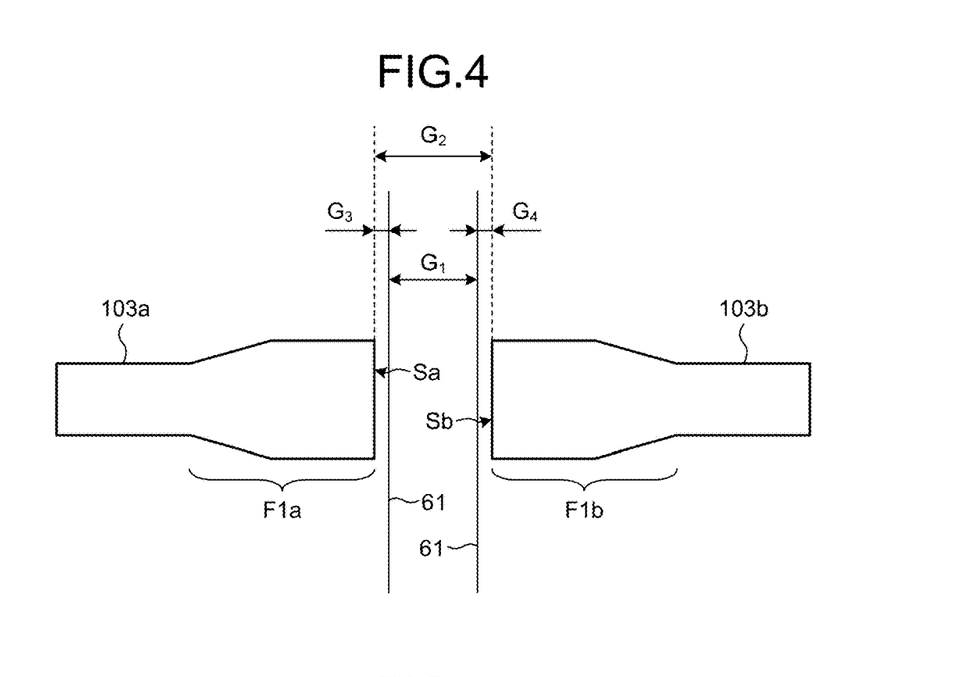
FIG. 4 is a plan view schematically illustrating an optical waveguide structure in a case where an end portion of a core has an MMI shape.
Figure 5:
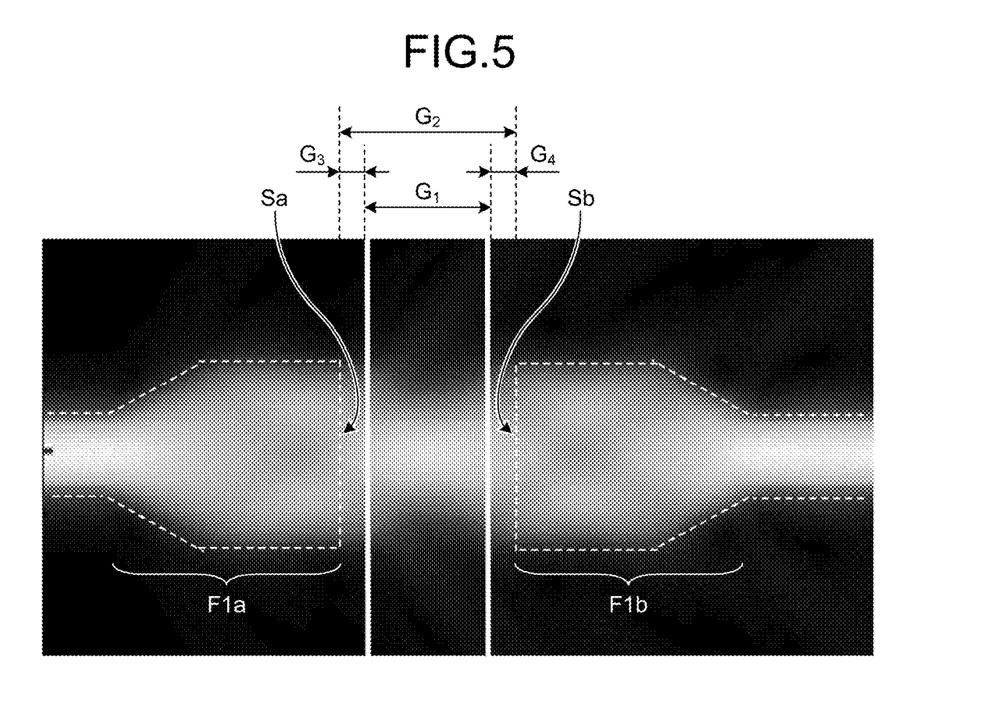
FIG. 5 is a view illustrating a propagation state in a case where the end portion of the core has the MMI shape.

FIG. 4 is a plan view schematically illustrating an optical waveguide structure in a case where an end portion of a core has a Multi-Mode Interference (MMI) shape. Note that, in FIG. 4, to make the end shape of the core easily visible, a position of an end surface of the slit 61 is illustrated as a straight line, and illustration of the optical element inserted into the slit 61 is omitted. FIG. 5 is a view illustrating a propagation state in a case where the end portion of the core has the MMI shape.

As illustrated in FIG. 4, in the optical waveguide structure according to the embodiment, end portions F1a and F1b of the cores 103a and 103b can each have the MMI shape.

As illustrated in FIG. 5, in a waveguide structure in which the end portions F1a and F1b of the cores 103a and 103b each have the MMI shape, light emitted from the end surface Sa of the core 103a is focused between the end surface Sa and the end surface Sb, and enters the end surface Sb. As a result, diffusion of the light emitted from the end surface Sa of the core 103a into the cladding is suppressed, and a coupling loss between the core 103a and the core 103b reduces. Then, such a propagation state is realized by appropriately designing the shapes of the end portions F1a and F1b of the cores 103a and 103b.

As illustrated in FIG. 4, in the optical waveguide structure according to the embodiment, since the parts composed of a material identical to a material of the cladding and having the widths $G_3$ and $G_4$ are interposed respectively between the end surfaces Sa and Sb of the cores 103a and 103b and the slit 61, even when a variation is generated in the position or the width $G_1$ of the slit 61, influence of such a variation on the shapes of the end portions F1a and F1b of the cores 103a and 103b is suppressed. In particular, since the width $G_2$ between the end surfaces Sa and Sb of the cores 103a and 103b greatly affects a coupling loss between the core 103a and the core 103b, the effect of the optical waveguide structure according to the present embodiment is significant. That is, the optical waveguide structure according to the present embodiment includes a configuration capable of suppressing a variation in a loss of an optical waveguide due to a variation in the slit width.

Structurally Optimized Shape

Figure 6:
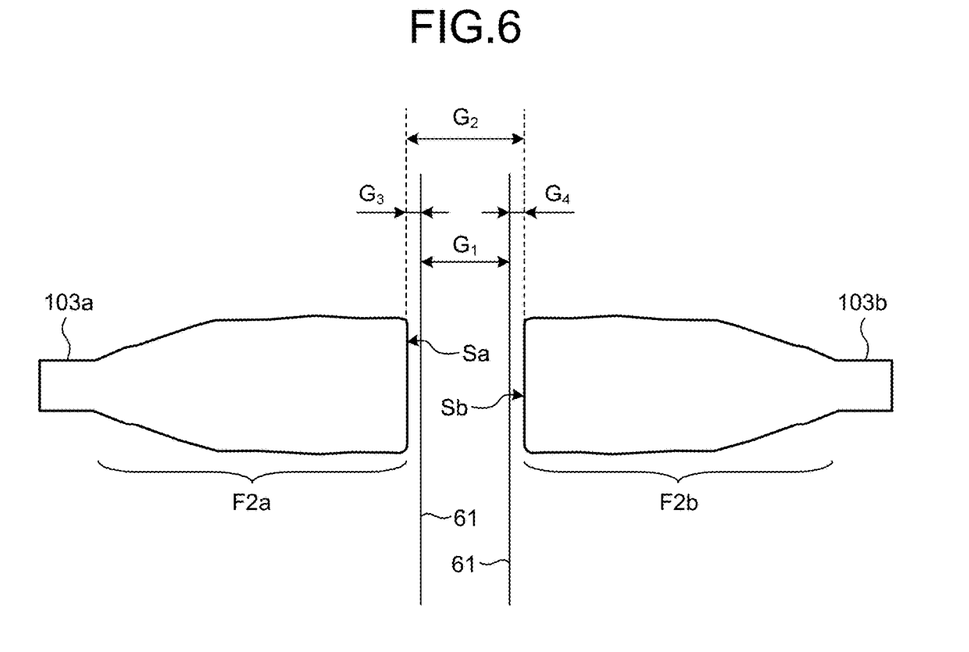
FIG. 6 is a plan view schematically illustrating an optical waveguide structure in a case where an end portion of a core has a structurally optimized shape.

FIG. 6 is a plan view schematically illustrating an optical waveguide structure in a case where an end portion of a core has a structurally optimized shape. As with FIG. 4, in FIG. 6, to make the end shape of the core easily visible, a position of an end surface of the slit 61 is illustrated as a straight line, and illustration of the optical element inserted into the slit 61 is omitted.

As illustrated in FIG. 6, in the optical waveguide structure according to the embodiment, end portions F2a and F2b of the cores 103a and 103b can each have a structurally optimized shape. Here, the structurally optimized shape refers to a shape determined through a computer simulation as a shape capable of suppressing to reduce a coupling loss by repeating a process including slightly perturbing the shape of each of the end portions F2a and F2b of the cores 103a and 103b and calculating a coupling loss in the perturbed shape through a computer simulation. A known method such as a wavefront matching method and a topology optimization method can be used as this optimization algorithm.

As illustrated in FIG. 6, in a waveguide structure in which the end portions F2a and F2b of the cores 103a and 103b each have the structurally optimized shape, the end surfaces Sa and Sb of the cores 103a and 103b may not be flat surfaces. This results from shapes of the end surfaces Sa and Sb of the cores 103a and 103b being also perturbed in the calculation process of the structural optimization.

That is, as illustrated in FIG. 6, in the optical waveguide structure according to the embodiment, since the parts composed of a material identical to a material of the cladding and having the widths $G_3$ and $G_4$ are interposed respectively between the end surfaces Sa and Sb of the cores 103a and 103b and the slit 61, the end surfaces Sa and Sb of the cores 103a and 103b can also be incorporated in shape parameters for the structural optimization, and a shape more suitable for suppressing a coupling loss can be adopted. In particular, since the width $G_2$ between the end surfaces Sa and Sb of the cores 103a and 103b greatly affects a coupling loss between the core 103a and the core 103b, the effect of the optical waveguide structure according to the present embodiment is significant. That is, the optical waveguide structure according to the present embodiment includes a configuration capable of suppressing a variation in a loss of an optical waveguide due to a variation in the slit width.

Tapered Shape

Figure 7:
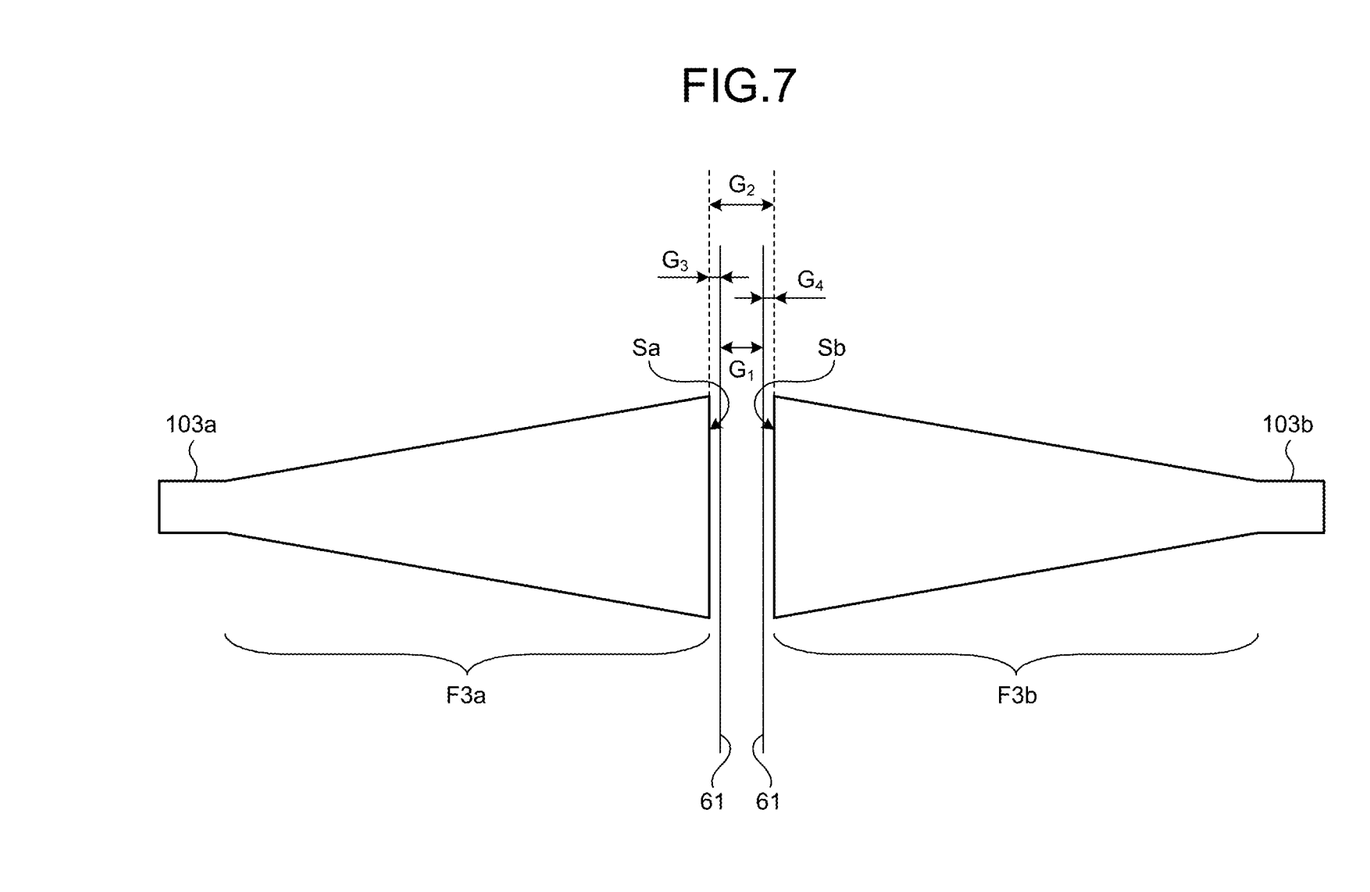
FIG. 7 is a plan view schematically illustrating an optical waveguide structure in a case where an end portion of a core has a tapered shape.
Figure 8:
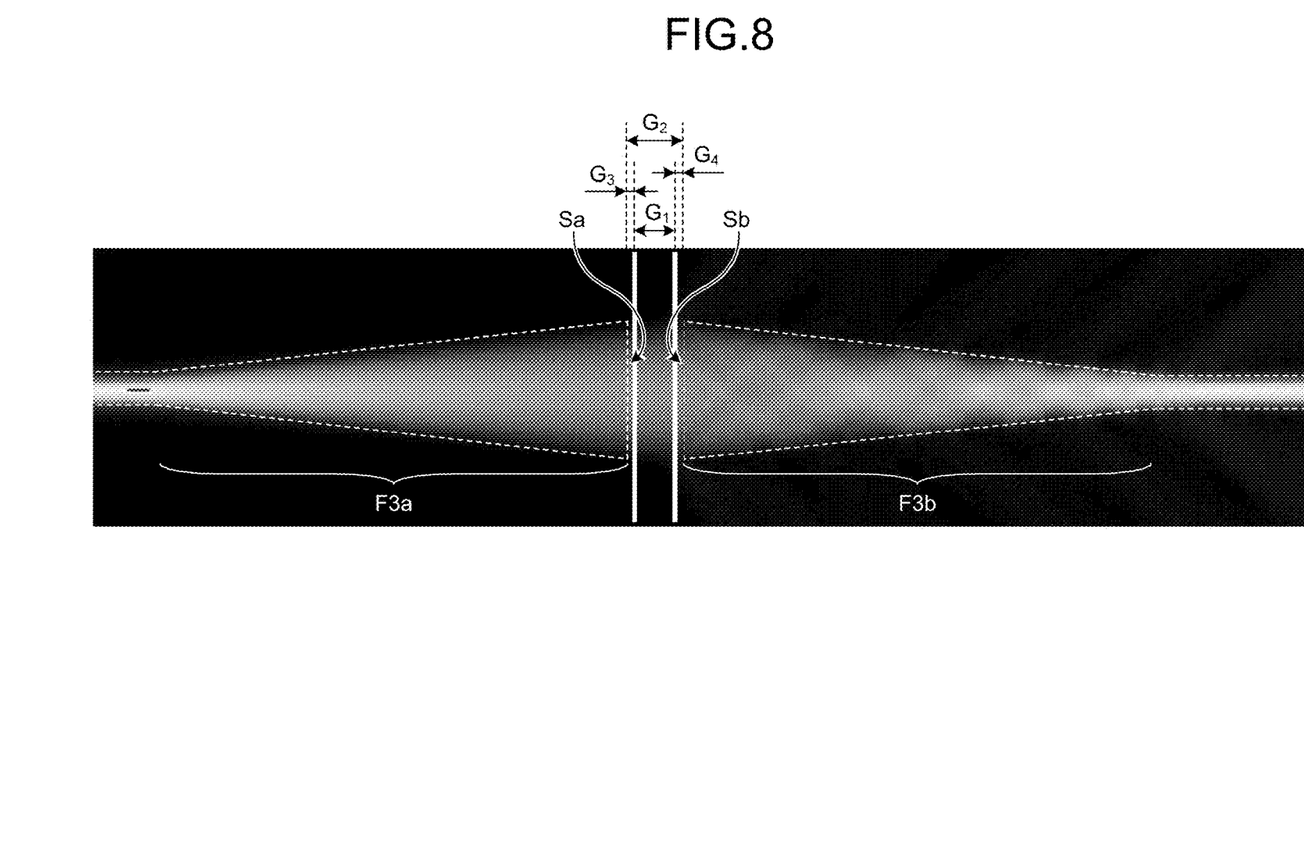
FIG. 8 is a view illustrating a propagation state in a case where the end portion of the core has the tapered shape.

FIG. 7 is a plan view schematically illustrating an optical waveguide structure in a case where an end portion of a core has a tapered shape. Note that as with FIG. 4, in FIG. 7, to make the end shape of the core easily visible, a position of an end surface of the slit 61 is illustrated as a straight line, and illustration of the optical element inserted into the slit 61 is omitted. FIG. 8 is a view illustrating a propagation state in a case where the end portion of the core has the tapered shape.

As illustrated in FIG. 7, in the optical waveguide structure according to the embodiment, end portions F3a and F3b of the cores 103a and 103b can each have a tapered shape.

As illustrated in FIG. 8, in a waveguide structure in which the end portions F3a and F3b of the cores 103a and 103b each have the tapered shape, diffusion of light emitted from the end surface Sa of the core 103a is absorbed by the tapered shape of the end portion F3b of the core 103b. As a result, the diffusion of the light emitted from the end surface Sa of the core 103a into the cladding is suppressed, and a coupling loss between the core 103a and the core 103b reduces. Similarly, in the case of the tapered shape, such a propagation state is realized by appropriately designing the shapes of the end portions F3a and F3b of the cores 103a and 103b.

As illustrated in FIG. 7, in the optical waveguide structure according to the embodiment, since the parts composed of a material identical to a material of the cladding and having the widths $G_3$ and $G_4$ are interposed respectively between the end surfaces Sa and Sb of the cores 103a and 103b and the slit 61, even when a variation is generated in the position or the width $G_1$ of the slit 61, influence of such a variation on the shapes of the end portions F3a and F3b of the cores 103a and 103b is suppressed. In particular, since the width $G_2$ between the end surfaces Sa and Sb of the cores 103a and 103b greatly affects a coupling loss between the core 103a and the core 103b, the effect of the optical waveguide structure according to the present embodiment is significant. That is, the optical waveguide structure according to the present embodiment includes a configuration capable of suppressing a variation in a loss of an optical waveguide due to a variation in the slit width.

When the slit is prepared by, for example, dicing, a variation in the width $G_1$ of the slit exists in ±3 µm. In contrast, the width $G_2$ between the end surfaces of the cores is determined by positional precision and line width precision of the cores, and is less than or equal to approximately ±0.3 µm. For example, in comparison under conditions where a slit of 20 µm is formed on an optical waveguide having a relative refractive index difference of 5% Δ between a core and a cladding, in a case where a variation in the width $G_1$ of the slit directly leads to a variation in the width $G_2$ between the end surfaces of the cores, a loss is ±0.45 dB, and in the case of the optical waveguide structure according to the present embodiment, since the width $G_2$ between the end surfaces of the cores is determined by positional precision and line width precision of the cores, a variation in a loss can be suppressed to ±0.05 dB.

Manufacturing Method Example

Here, an example of a manufacturing method of the optical waveguide circuit 100 according to the embodiment will be described with reference to FIG. 9. First, the substrate 101 composed of silicon, silica glass, or the like is prepared. Next, a layer composed of silica glass corresponding to a lower cladding 102c located below the core 103 is formed on the substrate 101, and thereafter, the layer is annealed and vitrified to transparent glass.

Next, a sputtering method is used to form a silica ($SiO_2$) layer doped with zirconia ($ZrO_2$) at a location corresponding to the core 103 on the lower cladding 102c. Then, the silica ($SiO_2$) layer doped with zirconia ($ZrO_2$) is processed by a photolithography technique, an etching technique, or the like to obtain a desired shape corresponding to the optical waveguide, and the core 103 having a refractive index higher than a refractive index of the cladding is formed.

Thereafter, an upper cladding 102d composed of a silica glass is formed on the core 103 and on the lower cladding 102c on which the core 103 is not formed.

Next, the slit 61 is formed, and any processing method such as dicing, etching processing, and laser processing may be adopted as the forming method of the slit. Among these options, etching processing can reduce a variation in the slit width and thus is more preferable. Although the optical waveguide structure according to the embodiment has resistance to a variation in the slit width, a reduction in a variation in the slit width enables designing the reduced width of the cladding between the core and the slit, and contributes to reducing a coupling loss.

Figure 9:
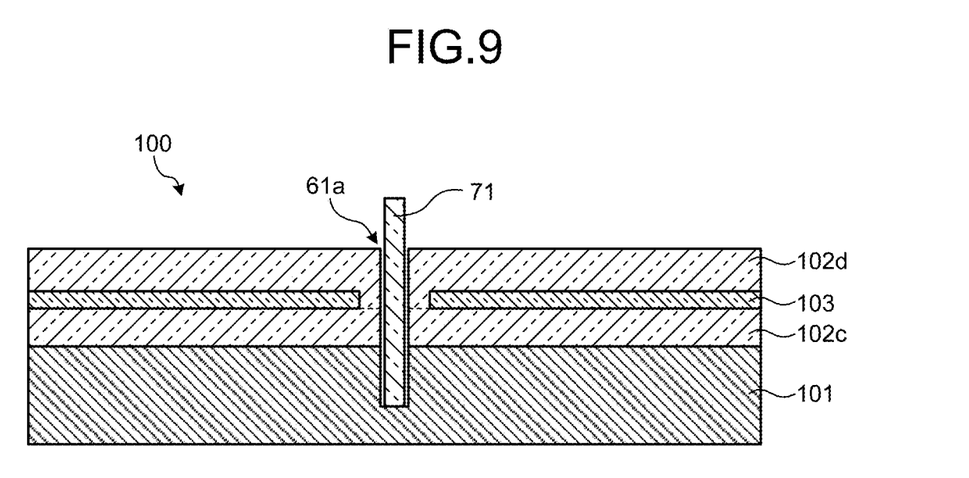
FIG. 9 is a view illustrating an example of a manufacturing method of an optical waveguide circuit according to the embodiment.

Here, as illustrated in FIG. 9, the depth of a slit 61a preferably reaches a depth including a part of the substrate 101. In general, the thickness of the cladding (the lower cladding 102c and the upper cladding 102d) of the optical waveguide circuit 100 is less than or equal to 100 µm, and to sufficiently stabilize the half waveplate 71, the depth of the slit 61a preferably reaches a depth including a part of the substrate 101. Note that in a case where the slit 61a is formed by etching processing, the cladding may be etched with an etching agent such as carbon tetrafluoride ($CF_6$), and the substrate composed of carbon may be etched with an etching agent such as sulfur hexafluoride ($SF_6$).

Figure 10:
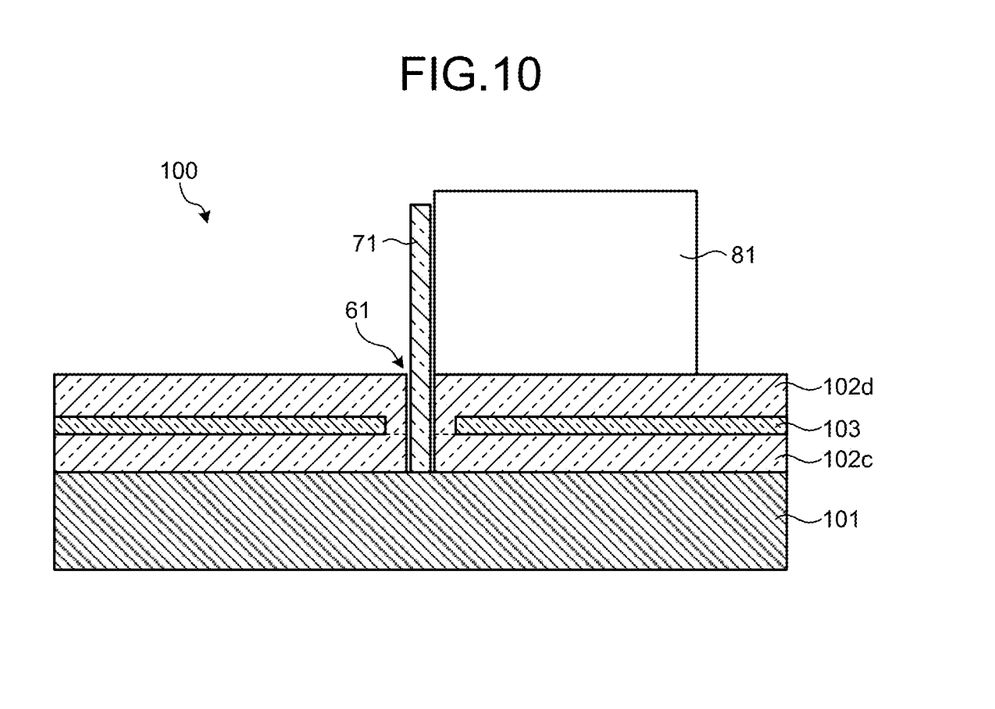
FIG. 10 is a view illustrating a configuration example in which a half waveplate is fixed to a glass block.

Note that although the slit 61a having the depth including a part of the substrate 101 is formed in the above-described example of the manufacturing method, even when the slit 61 is formed only in the cladding (the lower cladding 102c and the upper cladding 102d), a configuration capable of sufficiently stabilizing the half waveplate 71 can be adopted. For example, as illustrated in FIG. 10, a configuration in which a glass block 81 or the like is disposed on an edge of the slit 61, and the half waveplate 71 is fixed to the glass block 81 can also be adopted.

Modifications

Although the configuration example of the optical waveguide circuit according to the above-described embodiment is described assuming that the optical waveguide circuit is used as a coherent mixer used in a demodulator of a DP-QPSK modulation method, implementation of the present disclosure is not limited to this configuration example. For example, as illustrated in FIG. 11, the optical waveguide circuit according to the embodiment can also be applied to a polarization demultiplexer (or a polarization multiplexer).

Figure 11:
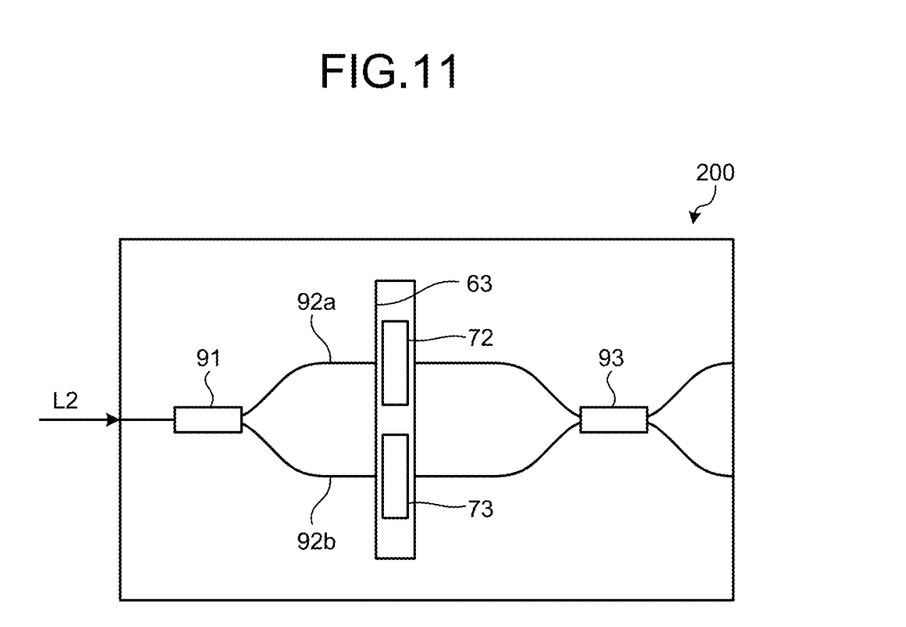
FIG. 11 is a view illustrating an example in which an optical waveguide circuit according to the embodiment is applied to a polarization demultiplexer.

FIG. 11 is a view illustrating an example in which the optical waveguide circuit according to the embodiment is applied to a polarization demultiplexer. As illustrated in FIG. 11, an optical waveguide circuit 200 includes a Y-branch optical waveguide 91, a directional coupler 93, and two arm optical waveguides 92a and 92b configured to connect the Y branch optical waveguide 91 and the directional coupler 93, and includes a Mach-Zehnder Interferometer type interferometer configuration.

A slit 63 is provided midway in the two arm optical waveguides 92a and 92b, and quarter waveplates 72 and 73 are each inserted into the slit 63. Here, the quarter waveplate 72 inserted midway in the arm optical waveguide 92a is inserted to have a slow axis perpendicular to the substrate, and the quarter waveplate 73 is inserted midway in the arm optical waveguide 92b to have a slow axis horizontal to the substrate.

According to the above-described configuration, the optical waveguide circuit 200 functions as a polarization demultiplexer configured to polarize and demultiplex input signal light L2. In addition, the optical waveguide structure according to the above-described embodiment can also be applied to the slit 63 in the optical waveguide circuit 200 including the above-described configuration. Then, as a result of applying the optical waveguide structure according to the embodiment, the optical waveguide circuit 200 capable of suppressing a variation in a loss of an optical waveguide due to a variation in the width of the slit 63 is realized.

Although the present disclosure is described above based on the embodiments, the present disclosure is not limited to the above-described embodiments. The present disclosure also includes configurations made by appropriately combining the respective constituent elements of the above-described embodiments. In addition, further effects and modifications can be conceived easily by those skilled in the art. Thus, broader modes of the present disclosure are not limited to the above-described embodiments, and various modifications can be made.

As described above, an optical waveguide structure and an optical waveguide circuit according to the present disclosure are useful for providing a slit midway in an optical waveguide.

An optical waveguide structure and an optical waveguide circuit according to the present disclosure exhibit an effect of being capable of suppressing a variation in a loss of an optical waveguide due to a variation in the slit width of a slit provided horizontally with respect to an optical waveguide.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical waveguide structure comprising:
   a cladding;
   a first core in the cladding having a first end surface;
   a second core in the cladding having a second end surface;
   a slit formed horizontally with respect to a waveguide direction of the light to be waveguided by the first and second cores; and
   a first part and a second part composed of a material identical to a material of the cladding,
   wherein a pair of the first and second end surfaces disposed opposing each other with the slit interposed between the pair of the first and second end surfaces,
   the first part is interposed between the first end surface and the slit,
   the second part is interposed between the second end surface and the slit, and
   each of the first and second parts has a length in the waveguide direction of the light to be waveguided by the core of less than or equal to 3 μm.

2. The optical waveguide structure according to claim 1, wherein each of end portions of the first and second cores has a shape designed to reduce a coupling loss between the first and second cores.

3. The optical waveguide structure according to claim 2, wherein each of the end portions of the first and second cores has a structurally optimized shape determined by repeatedly calculating a coupling loss in an end shape slightly perturbed.

4. An optical waveguide circuit comprising the optical waveguide structure according to claim 1.

5. The optical waveguide circuit according to claim 4, wherein the optical waveguide circuit serves as a coherent mixer used by a demodulator of a DP-QPSK modulation method.

6. The optical waveguide circuit according to claim 4, wherein the optical waveguide circuit serves as a polarization multiplexer-demultiplexer configured to demultiplex or multiplex a polarized wave of input light.

* * * * *